United States Patent [19]

Funakubo et al.

[11] Patent Number: 5,206,873

[45] Date of Patent: Apr. 27, 1993

[54] TURBO BLOWER FOR LASER AND LASER OSCILLATION DEVICE EMPLOYING THE TURBO BLOWER

[75] Inventors: Tsutomu Funakubo, Fujiyoshida; Norio Karube, Machida; Kenji Nakahara, Yamanashi, all of Japan

[73] Assignee: Fanuc Ltd., Minamitsuru, Japan

[21] Appl. No.: 700,174

[22] PCT Filed: Sep. 21, 1990

[86] PCT No.: PCT/JP90/01227

§ 371 Date: May 22, 1991

§ 102(e) Date: May 22, 1991

[87] PCT Pub. No.: WO91/05384

PCT Pub. Date: Apr. 18, 1991

[30] Foreign Application Priority Data

Oct. 4, 1989 [JP] Japan ................. 1-259825

[51] Int. Cl.$^5$ ............................................. H01S 3/22
[52] U.S. Cl. ................................. 372/58; 372/34; 372/59
[58] Field of Search ........................ 372/58, 34, 59

[56] References Cited

U.S. PATENT DOCUMENTS

| | | | |
|---|---|---|---|
| 3,638,140 | 1/1972 | Knapp et al. | 372/34 |
| 4,351,052 | 9/1982 | Sasaki et al. | 372/58 |
| 4,835,784 | 5/1989 | Gurs | 372/58 |
| 4,907,240 | 3/1990 | Klingel | 372/58 |
| 5,022,039 | 6/1991 | Karube et al. | 372/58 |
| 5,060,238 | 10/1991 | Karube et al. | 372/58 |
| 5,111,474 | 5/1992 | Funacubo et al. | 372/58 |

OTHER PUBLICATIONS

Patent Abstract of Japan, vol. 12, No. 461 (E-689) [3308], Dec. 5, 1988; & JP-A-63 184 381 (Toshiba) Jul. 29, 1988 Total.

Patent Abstract of Japan, vol. 13, No. 142 (E-739) [3490], Apr. 7, 1989; & JP-A-63 304 685 (Hamamatsu Photonics) Dec. 12, 1988 Total.

*Primary Examiner*—Léon Scott, Jr.
*Attorney, Agent, or Firm*—Staas & Halsey

[57] ABSTRACT

A turbo blower is used in combination with a gas laser oscillation device for machining, e.g., cutting off, workpieces. The turbo blower comprises a shaft (2) having an impeller (1) on one end thereof, a pair of bearings (5, 6) on which the shaft (2) is supported, and a motor (3, 4) for rotating the shaft. Heat radiating fins (11) are mounted on the shaft (2) for radiating the heat which is generated by a rotor (3) of the motor, thus preventing the heat from being transmitted to the bearings (5, 6). The heat radiating fins are forcibly cooled by a portion of a laser gas for thereby greatly increasing the heat radiation efficiency. The service life of the grease in the bearings and the bearings themselves is increased, thus reducing an expenditure of labor for grease replenishment and bearing replacement. The bearings are also increased in reliability.

32 Claims, 7 Drawing Sheets

TURBO BLOWER FOR LASER AND LASER OSCILLATION DEVICE EMPLOYING THE TURBO BLOWER

TECHNICAL FIELD

The present invention relates to a laser turbo blower for forcibly circulating a laser gas in a machining gas laser device and a laser oscillation device which employs such a laser turbo blower, and more particularly to a laser turbo blower which has bearings of increased service life and is improved in reliability and maintainability, and a laser oscillation device employing such a laser turbo blower.

BACKGROUND ART

Recent carbon dioxide ($CO_2$) gas laser oscillation devices are capable of producing high output power and emitting good-quality laser beams, and are widely used in laser machining applications such as metal or nonmetal material cutting and metal material welding. Particularly, those carbon dioxide gas laser oscillation devices which are coupled to CNC (computerized numerical control) systems to provide CNC laser machining apparatus are in widespread use in the application in which workpieces are cut to complex shapes at high speed with high precision.

One conventional carbon dioxide ($CO_2$) gas laser oscillation device will hereinafter be described with reference to the drawings.

Figure 6:
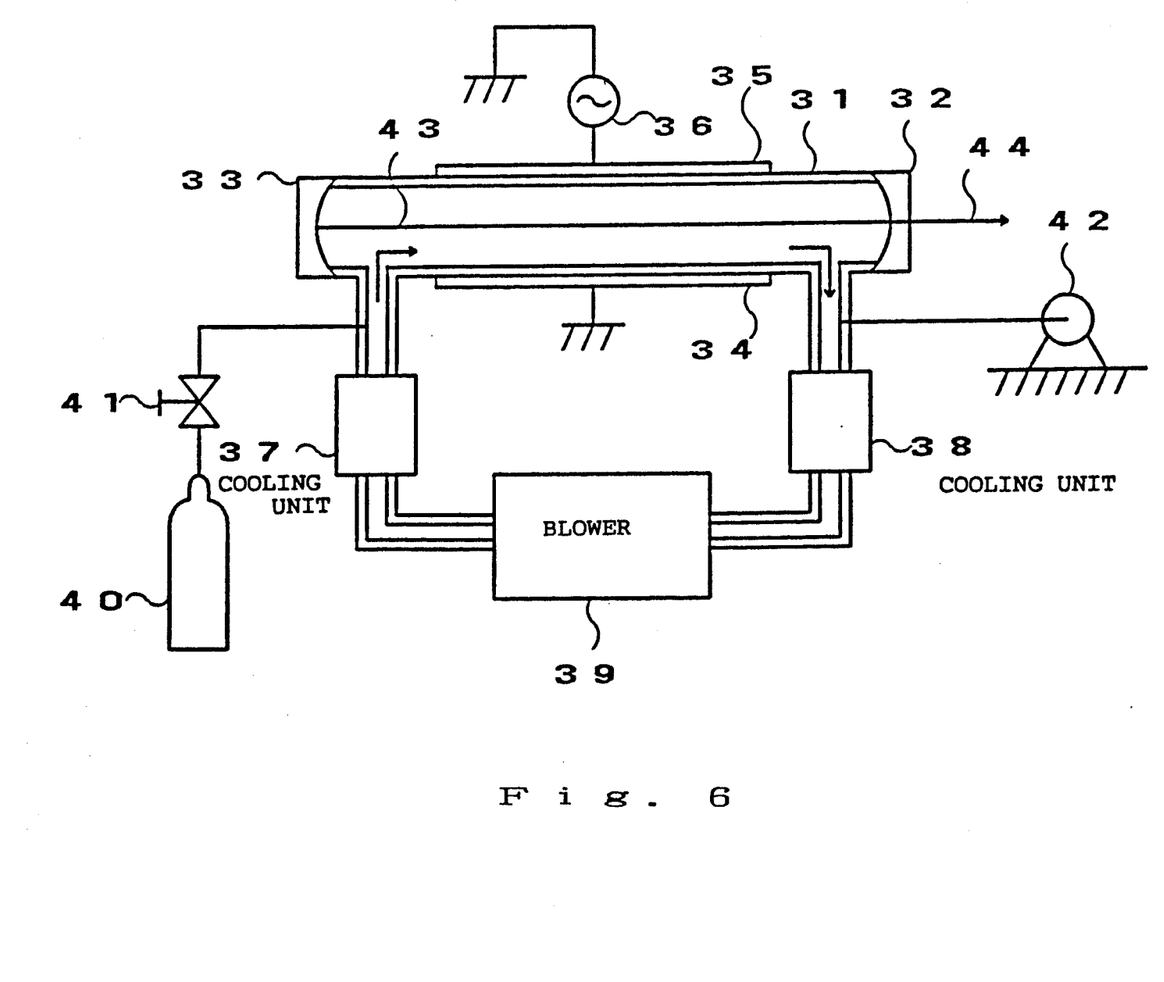
FIG. 6 is a view showing the entire structure of a conventional carbon dioxide ($CO_2$) gas laser oscillation device.

FIG. 6 of the accompanying drawings shows a conventional carbon dioxide ($CO_2$) gas laser oscillation device in its entirety. The laser oscillation device includes a discharge tube 31 combined with an optical resonator which comprises an output coupling mirror 32 and a fully reflecting mirror 33 that are connected to respective opposite ends of the discharge tube 31. Metal electrodes 34, 35, are attached to outer peripheral surfaces of the discharge tube 31, the metal electrode 34 being grounded and the metal electrode 35 being connected to a high-frequency power supply 36. The high-frequency power supply 36 applies a high-frequency voltage between the metal electrodes 34, 35 to produce a glow discharge in the discharge tube 31 for laser excitation. A laser beam is generated along an optical axis 43 in the discharge tube 31, and is emitted out of the discharge tube 31 from the output coupling mirror 32 along an optical axis 44.

Before the gas laser oscillation device is started, the entire device is evacuated by a vacuum pump 42, and a valve 41 is opened to introduce a laser gas at a given rate from a gas container 40 into the device until the pressure of the gas in the device reaches a predetermined level. The device is continuously evacuated by the vacuum pump 42 and the laser gas is continuously supplied through the valve 41 so that the laser gas is partly replaced with a fresh gas continuously while the gas pressure in the device is being kept at the predetermined level. In this manner, the interior of the device is prevented from being contaminated by the laser gas.

In FIG. 6, a blower 39 circulates the laser gas in the device in order to cool the laser gas. In the carbon dioxide ($CO_2$) gas laser, about 20% of the supplied electric energy is converted into a laser beam, whereas the rest of the applied electric energy is consumed to heat the laser gas. Since the gain of laser oscillation is theoretically proportional to the $-(3/2)$th power of the absolute temperature T, it is necessary to forcibly cool the laser gas in order to increase the oscillation efficiency.

In the device shown in FIG. 6, the laser gas flows through the discharge tube 31 at a rate of about 100 m/sec. in the direction indicated by the arrow into a cooling unit 38. The cooling unit 38 mainly serves to remove the thermal energy produced by the electric discharge from the laser gas. The blower 39 then compresses the laser gas which has been cooled. The compressed laser gas is thereafter introduced into the discharge tube 31 through another cooling unit 37. The cooling unit 37 serves to remove the heat produced upon compression of the laser gas in the blower 39, before the laser gas is introduced again into the discharge tube 31. The cooling units 37, 38 will not be described in detail as they are well known in the art.

Figure 7:
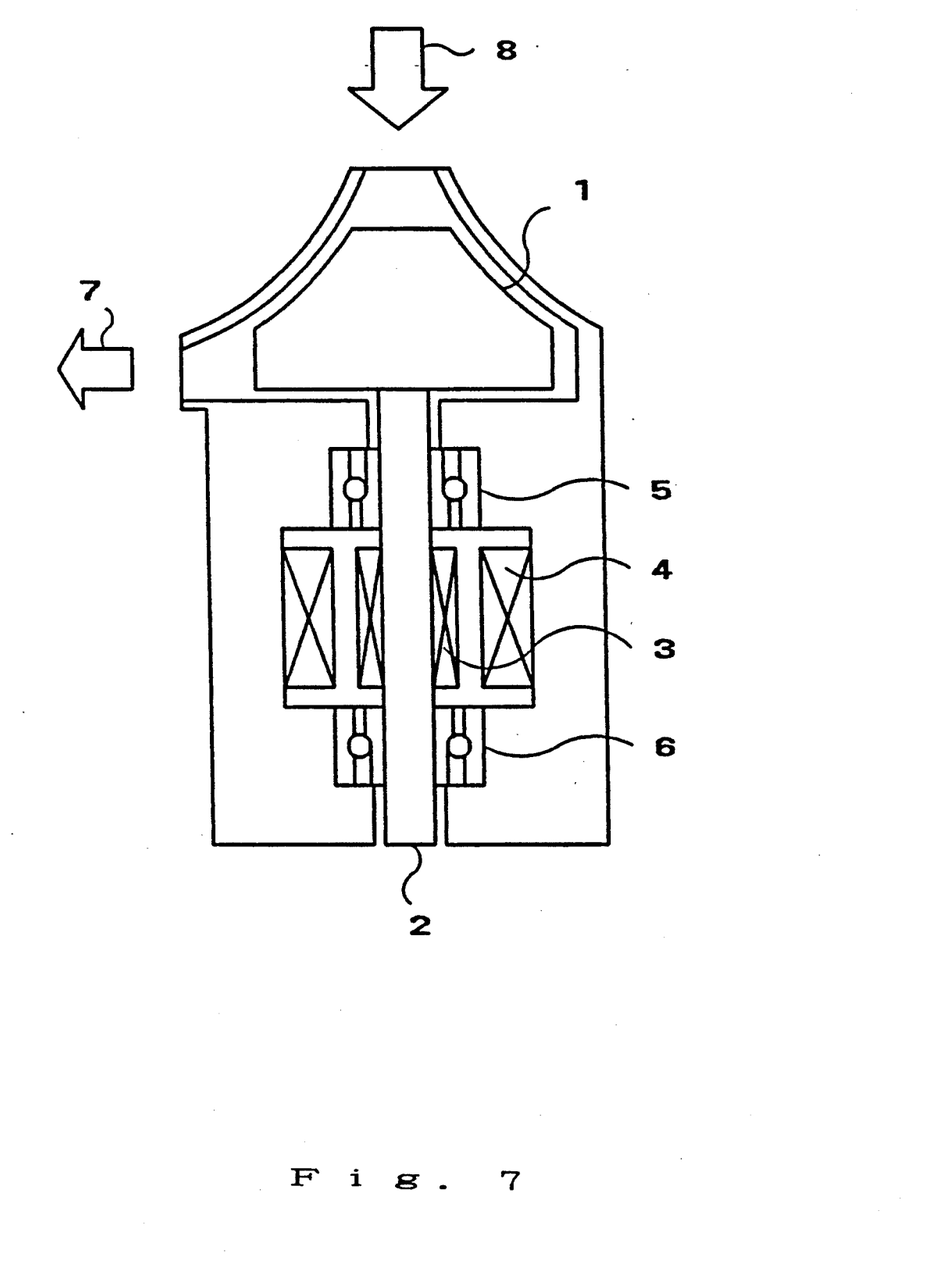
FIG. 7 is a cross-sectional view of a conventional laser turbo blower.

The blower 39 may be either a roots blower or a turbo blower. FIG. 7 of the accompanying drawings shows the structure of a conventional turbo blower for a laser. The turbo blower includes an impeller 1 mechanically coupled to a shaft 2 on which a rotor 3 is mounted. The rotor 3 and a stator 4 disposed therearound make up a high-frequency motor. The impeller 1 is rotated at a high speed of about 100,000 RPM by the high-frequency motor. Because of the high rotational speed of the impeller 1, the turbo blower is smaller in volume than the roots blower which rotates at lower speeds.

The shaft 2 is supported by a pair of roller bearings 5, 6 disposed one on each side of the high-frequency motor. The roller bearings 5, 6 are lubricated by grease in order to prevent contamination of the laser gas which would otherwise be caused by a lubricating oil mist.

The laser gas is drawn from the cooling unit 38 into the laser turbo blower as indicated by the arrow 8, and discharged from the laser turbo blower to the cooling unit 37 as indicated by the arrow 7.

The conventional laser oscillation device shown in FIGS. 6 and 7 has suffered the following drawbacks:

Inasmuch as the conventional laser turbo blower rotates at a high speed up to 100,000 RPM, the grease tends to be deteriorated and used up early. More specifically, the motor has an efficiency of about 75%, with the rest (25%) of the applied electric energy being converted into a heat loss. Therefore, if the motor has an output of 2 kw, then about 667 W is consumed as a heat loss. About 567 W of the heat loss is caused by the iron and copper losses of the stator 4, whereas about 100 W thereof is caused by the copper loss of the rotor 3.

When the rotor 3 is thus heated, its temperature goes up to 100° C. or higher. The stator 4 can be cooled by a water cooling unit disposed around the stator 4, but the rotor 3 cannot be cooled by a water cooling unit as it rotates at high speed. The motor cannot be cooled by air since only the laser gas is present under a 0.1 atmospheric pressure in the motor.

Therefore, the heat generated by the rotor 3 is transmitted through the shaft 2 to the bearings 5, 6 fixed to the shaft 2, thus heating and increasing the temperature of the bearings 5, 6. The bearings 5, 6 operate without fail up to the temperature of about 80° C. However, above the temperature of about 80° C., the service life of the bearings is reduced ½ in each increment of 10° C. because the lubricant of the bearings is deteriorated at higher temperatures.

If the bearings were continuously operated under the above condition, the bearings would be destroyed. Usually, therefore, the grease is replenished or the bearings are replaced at time intervals of 1000 hours. As a result, a large expenditure of labor has heretofore been necessary for maintenance.

The grease is vaporized by the heat transmitted to the bearings 5, 6, and the grease vapor is mixed with the laser gas. The mixed grease vapor contaminates the optical components, causing laser output power reductions and mode changes.

According to the conventional structure, the impeller 1 is positioned in the passage through which a large amount of laser gas is circulated. Therefore, the impeller 1 is always cooled, and temperature of the bearing 5 near the impeller 1 is not largely increased. However, since the bearing 6 remote from the impeller 1 is not cooled by the laser gas, the bearing 6 is directly affected by the temperature rise and very possibly may be damaged.

DISCLOSURE OF THE INVENTION

The present invention has been made in view of the aforesaid drawbacks. It is an object of the present invention to provide a laser turbo blower whose bearings are prevented from increasing their temperature and which is highly reliable and maintainable, and a laser oscillation device employing such a laser turbo blower.

To solve the above problems, there is provided in accordance with the present invention a turbo blower for a laser, comprising a shaft having an impeller on one end thereof, a pair of bearings on which the shaft is supported, and a motor for rotating the shaft, characterized in that heat radiating fins are mounted on the shaft.

There is also provided a laser oscillation device employing the turbo blower.

The heat generated by the rotor of the motor is radiated by the heat radiating fins on the shaft, and hence is prevented from being transmitted to the bearings. The heat radiating fins are forcibly cooled by a portion of the laser gas for thereby greatly increasing the heat radiation efficiency. The service life of the grease in the bearings and of the bearings themselves is increased, thus reducing an expenditure of labor for grease replenishment and bearing replacement. The bearings are also increased in reliability.

BEST MODE FOR CARRYING OUT THE INVENTION

An embodiment of the present invention will hereinafter be described with reference to the drawings.

Figure 1:
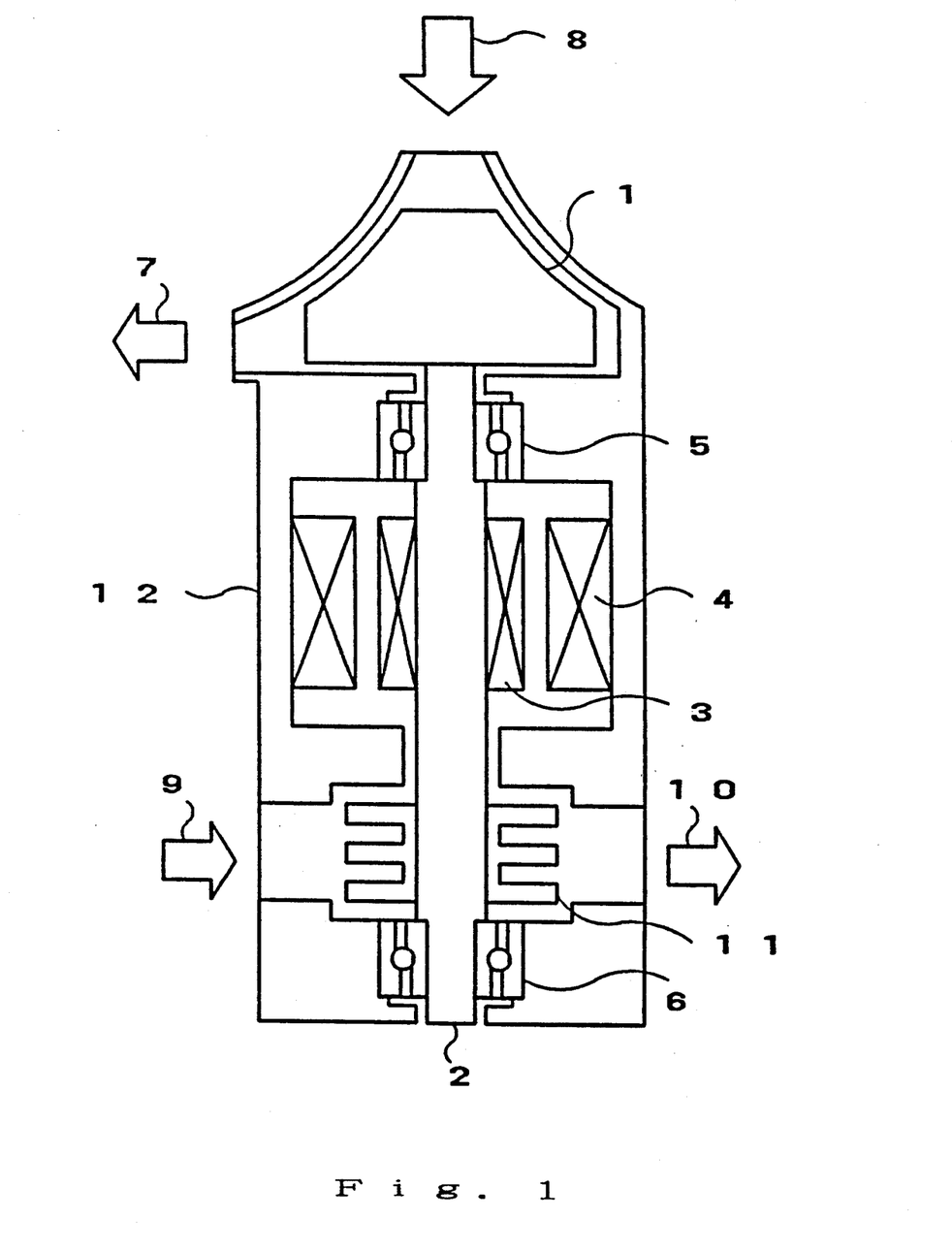
FIG. 1 is a cross-sectional view of a laser turbo blower according to a first embodiment of the present invention.

FIG. 1 shows a laser turbo blower according to a first embodiment of the present invention. Those components shown in FIG. 1 which are identical to those shown in FIG. 7 are denoted by identical reference numerals, and will not be described in detail. The impeller 1 is shown as being a centrifugal impeller, but may be a diagonal impeller or an axial-flow impeller.

The laser turbo blower according to the present embodiment essentially differs from the conventional laser turbo blower in that air-cooling heat radiating fins 11 are mounted on the shaft 2.

The heat radiating fins 11 are positioned between the rotor 3 and the bearing 6 which is remote from the impeller 1. A housing 12 of the laser turbo blower has a passage for a cooling laser gas which flows across the heat radiating fins 11 in the direction from the arrow 9 to the arrow 10. The heat generated by the rotor 3 is removed by the heat radiating fins 11 cooled by the laser gas, and does not reach the bearing 6.

The spaces in the bearing 5, 6, other than rollers and holders between inner and outer races thereof, are filled with a suitable amount of grease.

Figure 2:
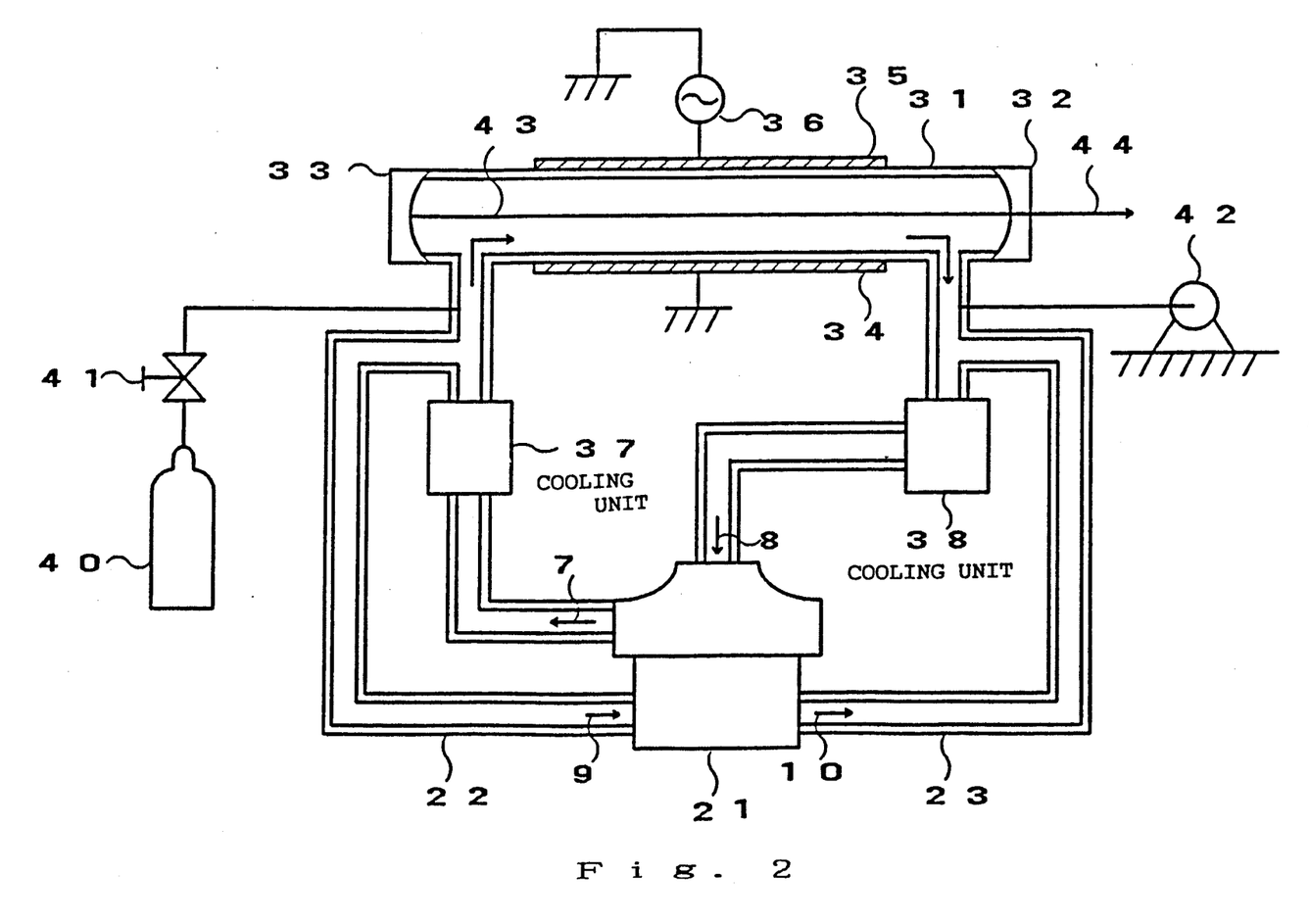
FIG. 2 is a view showing the entire structure of a laser oscillation device employing the laser turbo blower shown in FIG. 1.

FIG. 2 shows the entire structure of a laser oscillation device employing the laser turbo blower shown in FIG. 1. Those parts shown in FIG. 2 which are identical to those shown in FIG. 6 are denoted by identical reference numerals, and will not be described in detail.

In this embodiment, a portion of the circulating laser gas is supplied to a turbo blower 21 in order to cool the heat radiating fins 11 shown in FIG. 1. Specifically, a portion of the laser gas that is cooled by the cooling unit 37 is drawn through a return passage 22 into the turbo blower 21 in the direction indicated by the arrow 9. The laser gas which has removed the heat from the heat radiating fins 11 is discharged in the direction indicated by the arrow 10, and flows back to the laser gas circulation path through a passage 23. The laser gas thus returned is cooled by the cooling unit 38 and circulates in the device.

Unlike the conventional turbo blower, most of the heat generated by the rotor 3 of the motor is removed by the heat radiating fins 11. Because of the heat radiating fins 11, the bearing 6 is positioned at a greater distance from the rotor 3 which acts as a source of heat, and is less susceptible to the heat from the rotor 3.

Because the heat radiating fins 11 are forcibly cooled by the laser gas, the heat generated by the rotor 3 is transmitted through the shaft 2 and dissipated by the heat radiating fins 11.

The amount of heat q radiated by the cooling system is expressed, using a heat transfer coefficient h, as follows:

$$q = h \cdot A \cdot (T_2 - T_1)$$

where q is the amount of radiated heat (W), h the heat transfer coefficient (W/m$^2$K), A an area through which the heat is transmitted (m$^2$), and ($T_2 - T_1$) a temperature difference (K).

The heat transfer coefficient h of the cooling system based on forced convection of a gas is expressed, using the Nusselt number Nu (dimensionless number), as follows:

$$h = Nu \cdot k/d$$

where Nu is the Nusselt number (average), k the heat transfer coefficient (W/m²K) of the gas, and d the length (diameter).

Figure 3:
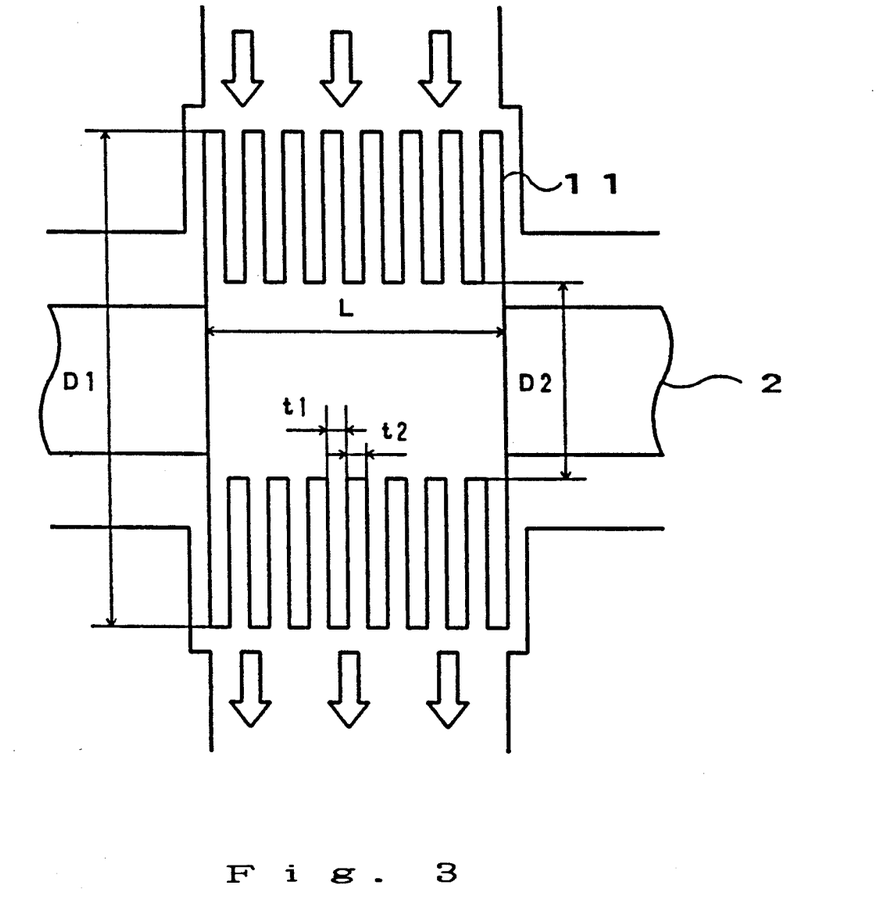
FIG. 3 is a detailed view showing heat radiating fins of the laser turbo blower shown in FIG. 1.

FIG. 3 shows in detail the heat radiating fins 11 shown in FIG. 1. It is assumed that the heat radiating fins have an axial length of 30 mm, each has thickness t1 of 2 mm, and are spaced at a distance t2 of 2 mm. The heat radiating fins 11 have an outside diameter D1 of 40 mm and an inside diameter D2 of 14 mm.

If the heat radiating fins 11 are used at a gas flow rate 0.018 (m³/s) with the gas temperature $T_1$ being 20° C. and the temperature $T_2$ of the shaft 2 being 100° C., the amount of heat radiated by the heat radiating fins 11 is about 97 W. The heat radiating fins 11 are therefore sufficiently effective since the amount of heat generated by the rotor 3 is about 100 W. An experiment conducted on the heat radiating fins 11 which were actually fabricated indicated that they were successful in lowering the temperature of the shaft 2 from about 110° C. to about 50° C.

Figure 4:
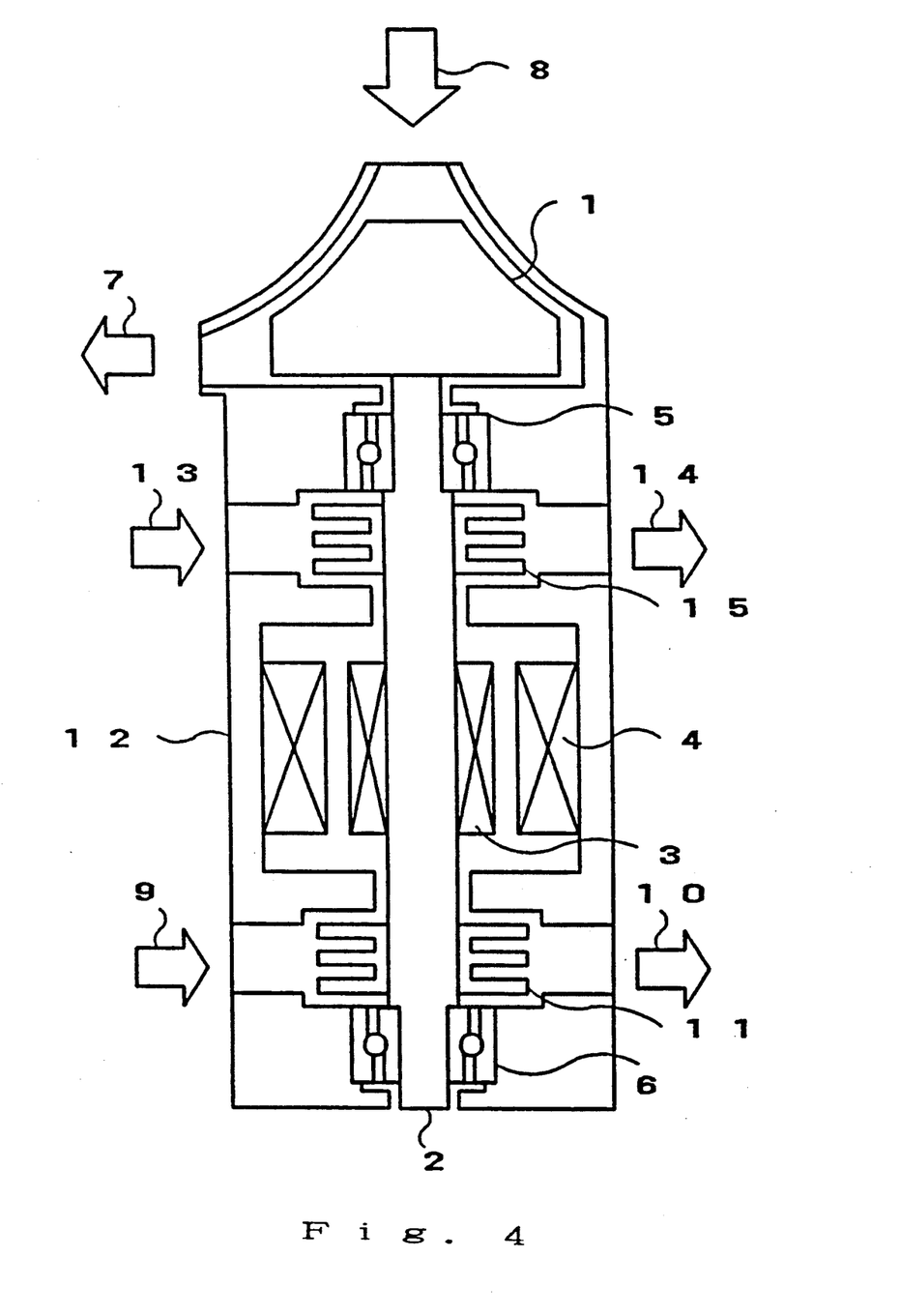
FIG. 4 is a cross-sectional view of a laser turbo blower according to a second embodiment of the present invention.

FIG. 4 shows a laser turbo blower according to a second embodiment of the present invention. Those parts shown in FIG. 4 which are identical to those shown in FIG. 1 are denoted by identical reference numerals, and will not be described in detail.

The laser turbo blower according to the second embodiment differs from the laser turbo blower shown in FIG. 1 only in that heat radiating fins 15 are also provided in addition to the heat radiating fins 11. The heat radiating fins 15 are positioned between the bearing 5 near the impeller 1 and the rotor 3. The housing 12 has a passage for a cooling laser gas which flows across the heat radiating fins 15 in the direction from the arrow 13 to the arrow 14. The heat generated by the rotor 3 is removed by the heat radiating fins 11, 15 cooled by the laser gas, and does not reach the bearing 5, 6.

Figure 5:
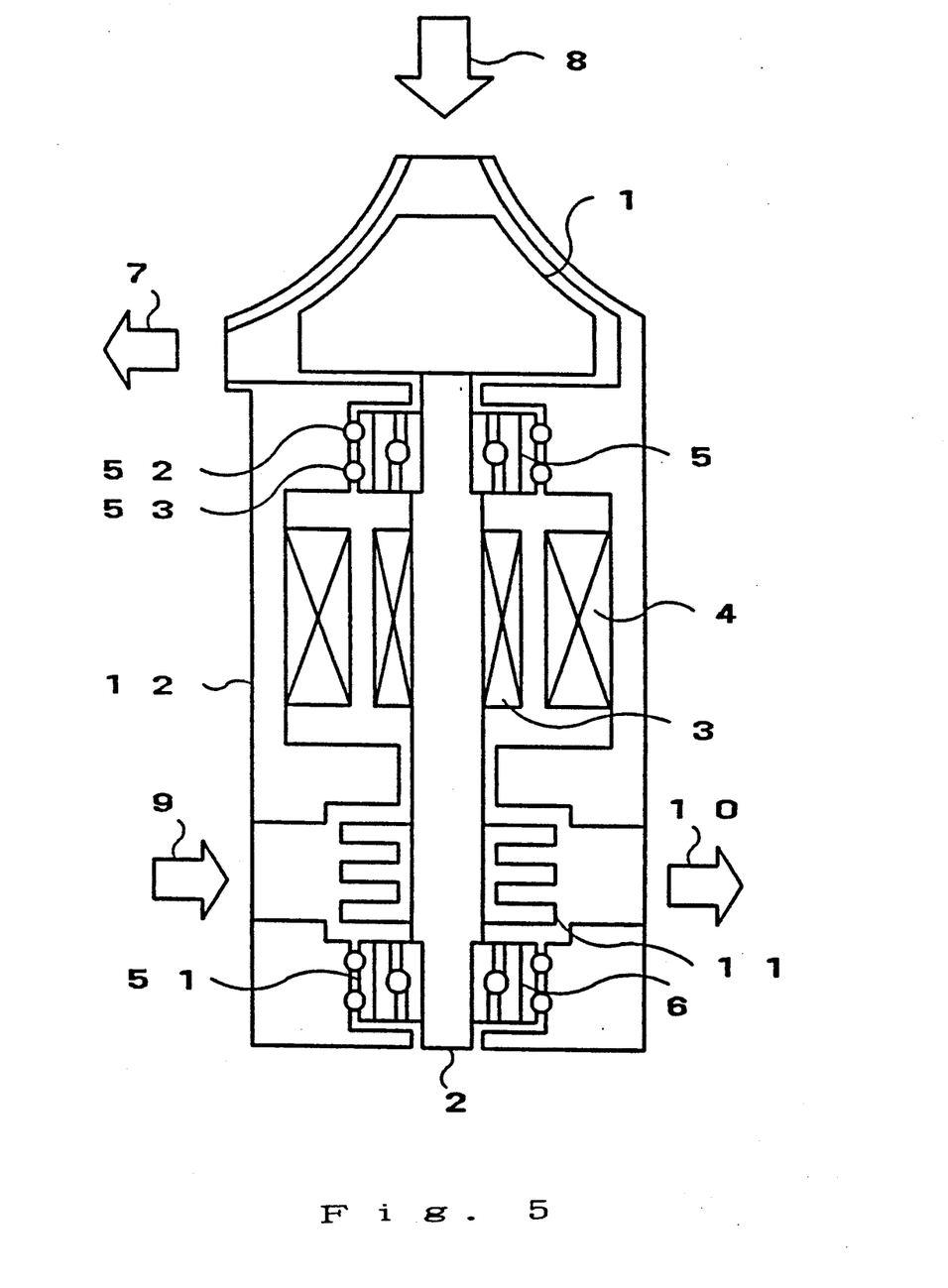
FIG. 5 is a cross-sectional view of a laser turbo blower according to a third embodiment of the present invention.

FIG. 5 shows a laser turbo blower according to a third embodiment of the present invention. The laser turbo blower according to the third embodiment resides in that oil film dampers are disposed around the bearings 5, 6 in the laser turbo blower shown in FIG. 1, for dampening vibrations of the bearings.

Each of the oil film dampers is composed of a sleeve 51, O-rings 52, 53, and a film of oil filled between the housing 12 and the sleeve 51.

The inner races of the roller bearings 5, 6 are fixed to the shaft 2, and the outer races thereof are fixed to the sleeves 51. The housing 12 and the sleeves 51 are spaced apart from each other by gaps ranging from 10 to 100 μm, the gaps being filled with grease or oil. The O-rings 52, 53 serve to isolate the grease or oil filled in the gaps from the laser gas.

With such an arrangement, vibrations produced when the impeller 1 and the shaft 2 rotate at high speed are dampened by a fluid dynamic effect of the oil film dampers.

While the roller bearings have been described in the above embodiments, ball bearings may be employed. The bearings may be made of ceramic.

In the above embodiments, since the bearings are prevented from increasing their temperature, the service life of the bearings is increased from a conventional range of from 500 to 1000 hours to a range of from 5000 to 15000 hours. Furthermore, maintenance processes such as periodic replenishment of grease or replacement of the bearings and grease is no longer necessary.

As described above, inasmuch as the bearings are prevented from increasing their temperature, and maintenance processes such as periodic replenishments or grease or replacement of the bearings and grease are rendered unnecessary, the laser turbo blower is improved in reliability and maintainability.

We claim:

1. A turbo blower for a laser, comprising a rotatable shaft having an impeller on one end therof, a pair of bearings supporting said shaft, a motor for rotating said shaft, and a heat radiating fin structure mounted on said shaft for rotation therewith.

2. A turbo blower according to claim 1, wherein is included means for directing a flow of laser gas past said heat radiating fins.

3. A turbo blower according to claim 2, further including a respective oil film damper mechanism for each of said bearings.

4. A turbo blower according to claim 2, wherein said bearings comprise ball bearings.

5. A turbo blower according to claim 2, wherein said bearings comprise roller bearings.

6. A turbo blower according to claim 2, wherein said bearings are made of ceramic.

7. A laser oscillation device comprising a discharge tube for producing an electric discharge in a gas for laser excitation, an optical resonator for causing laser oscillation, and a gas circulator having a blower and cooling units for forcibly cooling a laser gas, characterized in that said blower comprises a turbo blower according to claim 2.

8. A turbo blower according to claim 1, wherein one of said bearings is located between the motor and the impeller and the other bearing is located on the opposite side of the motor, said heat radiating fins being disposed between said motor and the other bearing.

9. A turbo blower according to claim 8, further including a respective oil film damper mechanism for each of said bearings.

10. A turbo blower according to claim 8, wherein said bearings comprise ball bearings.

11. A turbo blower according to claim 8, wherein said bearings comprise roller bearings.

12. A turbo blower according to claim 8, wherein said bearings are made of ceramic.

13. A laser oscillation device comprising a discharge tube for producing an electric discharge in a gas for laser excitation, an optical resonator for causing laser oscillation, and a gas circulator having a blower and cooling units for forcibly cooling a laser gas, characterized in that said blower comprises a turbo blower according to claim 8.

14. A turbo blower according to claim 1, wherein a first part of said heat radiating fin structure is disposed between said motor and said one of said bearings, and a second part of said heat radiating fin structure is disposed between said motor and the other of said bearings.

15. A turbo blower according to claim 14, further including a respective oil film damper mechanism for each of said bearings.

16. A turbo blower according to claim 14, wherein said bearings comprise ball bearings.

17. A turbo blower according to claim 14, wherein said bearings comprise roller bearings.

18. A turbo blower according to claim 14, wherein said bearings are made of ceramic.

19. A laser oscillation device comprising a discharge tube for producing an electric discharge in a gas for laser excitation, an optical resonator for causing laser oscillation, and a gas circulator having a blower and cooling units for forcibly cooling a laser gas, characterized in that said blower comprises a turbo blower according to claim 14.

20. A turbo blower according to claim 1, further including a respective oil film damper mechanism for each of said bearings.

21. A turbo blower according to claim 20, wherein said bearings comprise ball bearings.

22. A turbo blower according to claim 20, wherein said bearings comprise roller bearings.

23. A turbo blower according to claim 20, wherein said bearings are made of ceramic.

24. A laser oscillation device comprising a discharge tube for producing an electric discharge in a gas for laser excitation, an optical resonator for causing laser oscillation, and a gas circulator having a blower and cooling units for forcibly cooling a laser gas, characterized in that said blower comprises a turbo blower according to claim 20.

25. A turbo blower according to claim 1, wherein said bearings comprise ball bearings.

26. A laser oscillation device comprising a discharge tube for producing an electric discharge in a gas for laser excitation, an optical resonator for causing laser oscillation, and a gas circulator having a blower and cooling units for forcibly cooling a laser gas, characterized in that said blower comprises a turbo blower according to claim 25.

27. A turbo blower according to claim 1, wherein said bearings comprise roller bearings.

28. A laser oscillation device comprising a discharge tube for producing an electric discharge in a gas for laser excitation, an optical resonator for causing laser oscillation, and a gas circulator having a blower and cooling units for forcibly cooling a laser gas, characterized in that said blower comprises a turbo blower according to claim 27.

29. A turbo blower according to claim 1, wherein said bearings are made of ceramic.

30. A laser oscillation device comprising a discharge tube for producing an electric discharge in a gas for laser excitation, an optical resonator for causing laser oscillation, and a gas circulator having a blower and cooling units for forcibly cooling a laser gas, characterized in that said blower comprises a turbo blower according to claim 29.

31. A laser oscillation device comprising a discharge tube for producing an electric discharge in a gas for laser excitation, an optical resonator for causing laser oscillation, and a gas circulator having a blower and cooling units for forcibly cooling a laser gas, characterized in that said blower comprises a turbo blower according to claim 1.

32. A laser oscillation device comprising a discharge tube for producing an electric discharge in a gas for laser excitation, an optical resonator for causing laser oscillation, and a gas circulator having a blower and cooling units for forcibly cooling a laser gas, characterized in that said blower comprises a turbo blower according to claim 31.

* * * * *